United States Patent [19]

Kishi et al.

[11] Patent Number: 5,069,421
[45] Date of Patent: Dec. 3, 1991

[54] SAFETY DEVICE FOR A PNEUMATIC TOOL

[75] Inventors: Katsunobu Kishi; Kinya Nose, both of Tokyo, Japan

[73] Assignee: Nitto Kohki Co., Ltd., Tokyo, Japan

[21] Appl. No.: 569,449

[22] Filed: Aug. 20, 1990

[30] Foreign Application Priority Data

Oct. 24, 1989 [JP] Japan .............................. 1-124158[U]

[51] Int. Cl.⁵ ...................... F16K 31/60; F16K 35/02
[52] U.S. Cl. ......................... 251/99; 16/112;
16/DIG. 30; 16/DIG. 36; 74/523; 74/526;
173/170; 251/105; 251/113
[58] Field of Search ........................ 251/95, 96, 98, 99,
251/111, 113, 105, 106; 74/523, 526; 173/169, 170

[56] References Cited

U.S. PATENT DOCUMENTS

| | | | |
|---|---|---|---|
| 1,027,061 | 5/1912 | Norling | 251/113 |
| 2,357,385 | 9/1944 | De Paepe | 251/113 |
| 2,618,459 | 11/1952 | Forss | 251/113 |
| 4,018,292 | 4/1977 | Roll et al. | 173/170 |
| 4,254,667 | 3/1981 | Wong | 173/170 |
| 4,267,747 | 5/1981 | Wallace et al. | 251/98 |
| 4,444,091 | 4/1984 | Jorgensen, Jr. | 251/95 |
| 4,619,435 | 10/1986 | Biek | 251/113 |

FOREIGN PATENT DOCUMENTS 62-21420  5/1987  Japan .

Primary Examiner—George L. Walton
Attorney, Agent, or Firm—Nixon & Vanderhye

[57] ABSTRACT

A safety device for a pneumatic tool having a body and an operation lever and a valve stem lowered by the operation lever has an axially movable pivot shaft by which the operation lever is pivoted to one end of the main body of the pneumatic tool. A stop is formed on the pivot shaft so as to move between a resting position and an operating position together with the pivot shaft. A conical coil spring is provided to urge the operation lever upward by its torsional action and the stop as well as the pivot shaft toward the resting position of the stop by its compressive action. A receiving chamber is formed in the operation lever at a position where it coincides with the stop when the stop is moved to the operating position by the depressing of the pivot shaft. When, in this state, the operation lever is pushed downward to cause the stop to enter the receiving chamber, the valve stem is lowered and the operation of the pneumatic tool starts.

11 Claims, 3 Drawing Sheets

SAFETY DEVICE FOR A PNEUMATIC TOOL

BACKGROUND OF THE INVENTION

1. Field of the Invention

This invention relates to a safety device for a pneumatic tool such as an air hammer or an air grinder, the operation of which is initiated and terminated by means of an operation lever.

2. Description of the Related Art

Unexamined Japanese Utility Model Registration Application Publication Sho No. 62-21420 discloses a safety device for a pneumatic tool operated by a lever. FIGS. 1 and 2 show this conventional safety device. An operation lever 1 has one end pivoted to the rear end portion of the pneumatic tool 2 by means of a pin 3 and is pushed upward to an inclined state by means of a spring 4, as shown in FIG. 1. When a valve stem 13 is lowered by the operation lever 1, the pneumatic tool 2 is operated. A slide plate 5 and a stop plate 6 are fixed together by means of a screw 11 so that they contact with and are slidable on the upper and lower faces of the operation lever 1, respectively. When the pneumatic tool 2 is not being operated, the distal end 15 of the stop plate 6 abuts against a safety pin 14 fixed to the main body of the pneumatic tool 2 by the urging force of a spring 12 received in a recess 9 formed in the operation lever 1 so that the operation lever 1 is prevented by means of the safety pin 14 from being lowered. If depressed when the pneumatic tool 2 is in the unoperated state, the lever 1 will not rotate downward around the pin 3. Therefore, the safety of the pneumatic tool 2 is ensured when it is not being operated.

As a push portion 8 is moved rightward, as shown in FIG. 1, against the biasing force of the spring 12 by the operator's finger, the stop plate 6 is displaced to the position where a pin hole A formed in the stop plate 6 coincides with a pin hole B formed in the operation lever 1. When the lever 1 is rotated downward in this state, the safety pin 14 is inserted in the holes A and B, and the operation lever 1, without being obstructed in its operation by any other members, pushes the valve stem 13. In other words, the operation of the pneumatic tool 2 can start only when the operation lever 1 occupies this position.

However, in the case of the conventional safety device, the slide plate 5 and the stop plate 6 slidably mounted on the upper and lower faces of the operation lever 1 and the spring 12 housed therein result in the operation lever 1 being very thick, making it somewhat difficult to operate. Further, since the slide plate 5 as well as the push portion 8 thereof projects from the upper face of the operation lever 1, the operator's palm may sometimes hit against the projecting portion of the slide plate 5, including prickly sensation in his palm when the operation lever 1 is pushed. Still further, the safety device requires many parts including the safety pin 14, rendering its structure complicated.

SUMMARY OF THE INVENTION

In order to overcome the drawbacks associated with the prior art, this invention provides a safety device having a simple structure and an operation lever formed with a flat, smooth surface where the operator's palm makes contact so that the operator does not feel any prickly sensation in his palm, when he pushes the operation lever.

According to this invention, a safety device of a pneumatic tool having an operation lever with one end pivoted to the main body of the pneumatic tool, the safety device being adapted to start the operation of the pneumatic tool by pushing the operation lever comprises an axially movable pivot shaft pivoting the one end of the operation lever to the main body of the pneumatic tool and axially biased by means of a coil spring having the functions of torsion and compression, a receiving chamber formed in the operation lever so as to be opposed to the pivot shaft, and a stop formed on the pivot shaft and arranged to enter the receiving chamber.

When the pneumatic tool is in the non-operated state, the pivot shaft is rendered free and the stop is held by means of the biasing force of the coil spring in a position 2 where it is displaced from the area under the receiving chamber formed in the operation lever such that the operation lever cannot be rotated downward even if depressed.

On the other hand, where the pivot shaft of the operation lever is pushed axially into the main body of the pneumatic tool, the stop coincides with the receiving chamber, allowing the operation lever to be pushed down. As the operation lever is moved downward, the valve stem in contact with the lower face of the operation lever is lowered so as to operate the pneumatic tool.

At the end of operation of the pneumatic tool, both the pivot shaft and the operation lever are released. As the pivot shaft returns, the stop is displaced from the area under the receiving chamber, and the valve stem lifts to render the pneumatic tool inoperable. In this state, the stop hinders the operation lever from being lowered.

The provision of the axially displaceable pivot shaft of the operation lever of the stop for limiting the rotation of the operation lever which depresses the valve stem, and the provision of the coil spring which is disposed between the operation lever and the pivot shaft and functions as a torsional spring and a compression spring, prevent unwanted rotation of the operation lever unless the pivot shaft is axially pushed into the main body of the pneumatic tool. This structure therefore protects against accidental operation of the pneumatic tool so as to assure its safety.

Further, by virtue of being provided on the pivot shaft of the operation lever, the pneumatic tool can operate without being obstructed by the safety device when the safety device is set in the operated state, and its simple structure results in a low manufacturing cost.

Still further, since the upper face of the operation lever has no projecting portion against which the operator's palm could hit, the operator can therefore place his palm on the upper face of the operation lever and cannot feel any prickly sensation therein as in the case of the prior art.

DETAILED DESCRIPTION OF THE DRAWINGS

This invention will be fully understood from the following detailed description with reference to the accompanying drawings in which.

DETAILED DESCRIPTION OF THE PREFERRED EMBODIMENTS

The first embodiment of this invention will now be explained with reference to FIGS. 3 to 6.

Figure 4:
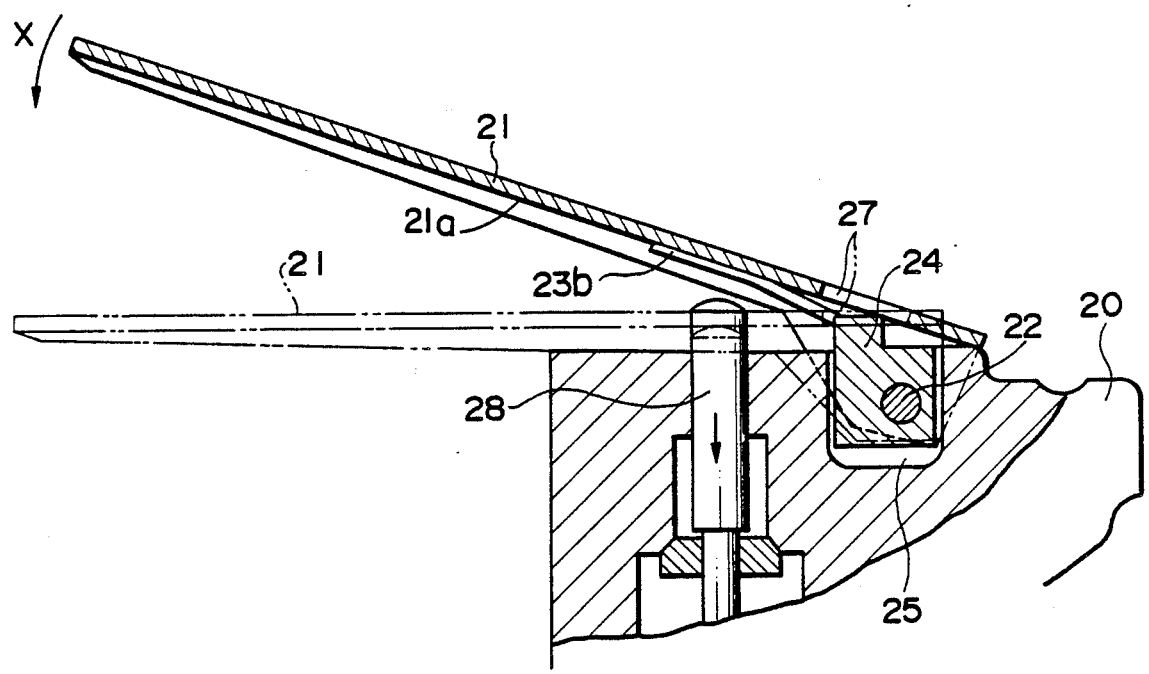
FIG. 4 is a cross-sectional view along line 4—4 of FIG. 3.
Figure 5:
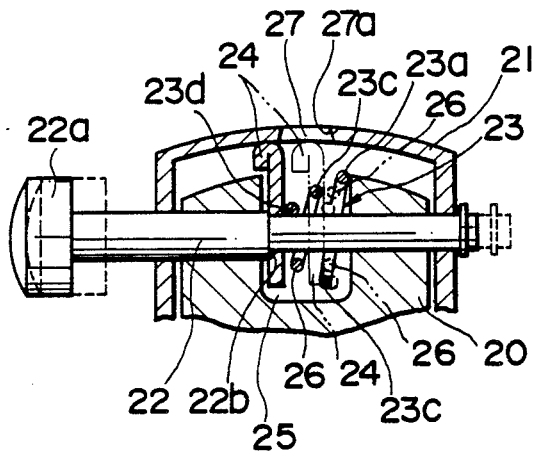
FIG. 5 is a cross-sectional view along line 5—5 of FIG. 3.
Figure 6:
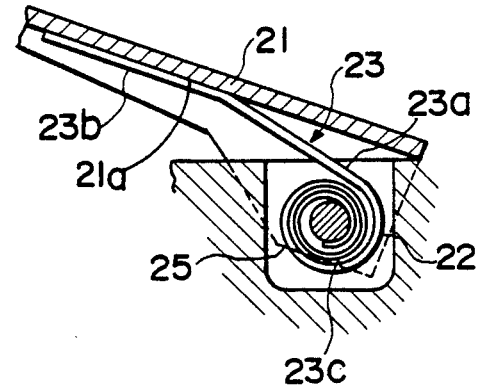
FIG. 6 is a front view of a coil spring of the first embodiment, in a state where it urges the operation lever to the elevated state.

An operation lever 21 having a lower face 21a which is used to start the operation of a pneumatic tool is rotatably supported at one end thereof by means of a pivot shaft 22 on the upper rear portion of the main body 20 of the pneumatic tool, so that said one end of the operation lever 21 abuts against the upper surface of the main body 20 at its rear portion when the operation lever 21 is in an elevated state as shown in FIG. 4.

A conical coil spring (hereinafter referred to as the "coil spring") 23 has a large diameter portion 23a and a free end portion 23b extending linearly from the outer end of the large diameter portion 23a.

The operation lever 21 is urged upwardly by the biasing force of that free end portion 23b of the coil spring 23 which contacts the lower surface of the lever 21, and is held in an inclined state, as shown by the solid line in FIG. 4, when it is in the non-operated state.

The pivot shaft 22 of the operation lever 21 is slidable in its axial directions and is provided on its front end with an operation button 22a. A stop 24 is fixed onto the pivot shaft 22 in a housing chamber 25 formed in the main body 20 of the pneumatic tool.

The coil spring 23, which functions as a compression spring and a torsion spring, has a conically coiled main portion 23c whose large diameter portion 23a is pressed against the step portion 22b of the pivot shaft 22 and the small diameter portion 23d of which is urged against the inner face of the operation button 22a so that the coil spring 23 is securely received in the housing chamber 25. The pivot shaft 22 is urged, via the stop 24, by means of the coil spring 23 in the direction in which the operation button 22a extends from the lateral wall of the main body 20 of the pneumatic tool so that the pivot shaft 22 is in the position as shown by the solid lines in FIG. 5, when the operation button 22a is not depressed.

Formed in the operation lever 21 is an opening 27 constituting a receiving chamber so that it is disposed just above the central part of the housing chamber 25. Upon pushing the pivot shaft 22 into the main body 20 of the pneumatic tool against the biasing force of the coil spring 23, the stop 24 is moved from a resting position, as shown by the solid line in FIG. 3, to an operating position as shown by the two-dot chain lines, at which the stop 24 coincides with the opening 27, and thereafter, upon depressing the operation lever 21 as shown by the two-dot chain lines in FIG. 4, the upper portion of the stop 24 enters the opening 27 without obstructing the lowering of the operation lever 21. In this state, the pushing-down of the operation lever 21 lowers the valve stem 28 to start the operation of the pneumatic tool. The head of the stop 24 can be rounded to enable it and the operation lever 21 to be moved smoothly.

Figure 8:
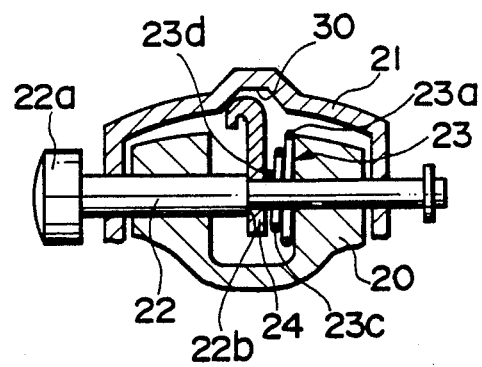

End walls 27a of the opening 22, which are separated from each other axially of the pivot shaft 22, are both inclined with respect to the pivot shaft 22 in order to guide the entrance of the stop 24 into the opening 22 such that the distance between the end walls decreases as they approach the upper surface of the operation lever 21. However, the left end wall 27a may alternatively be inclined and the right end wall 27a may be perpendicular to the pivot shaft 22, or both end walls 27a may be perpendicular to the pivot shaft 22. Further, the opening 27 may be replaced by a recess 30 as a receiving chamber formed in the operation lever 21 and having a trapezoidal cross section taken along the axial direction of the pivot shaft 22, as shown in FIG. 8. The inclined end walls of the recess 30 would function in a manner similar to those of the opening 27 in FIG. 5.

The operation of the embodiment of FIGS. 3 to 6 will now be explained.

When the operation lever 21 is depressed without first pushing the pivot shaft 22 into the main body 20 of the pneumatic tool, the operation lever 21 will not rotate around the pivot shaft 22 in the direction X shown in FIG. 4, due to the abutment of the stop 24 against the lower face 21a of the operation lever 21.

In order to start the pneumatic tool, therefore, the following steps must be carried out.

Figure 1:
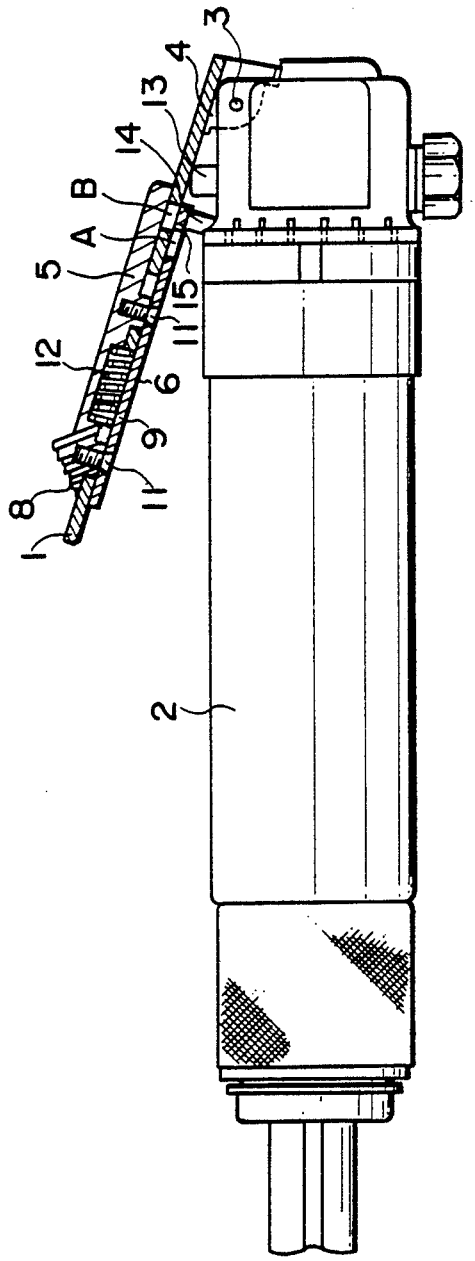
FIG. 1 is a partial cutaway lateral elevational view of an example of a pneumatic tool having an operation lever and a safety device of the prior art.
Figure 2:
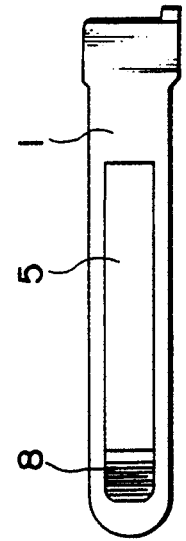
FIG. 2 is a plan view of the operation lever of FIG. 1.
Figure 3:
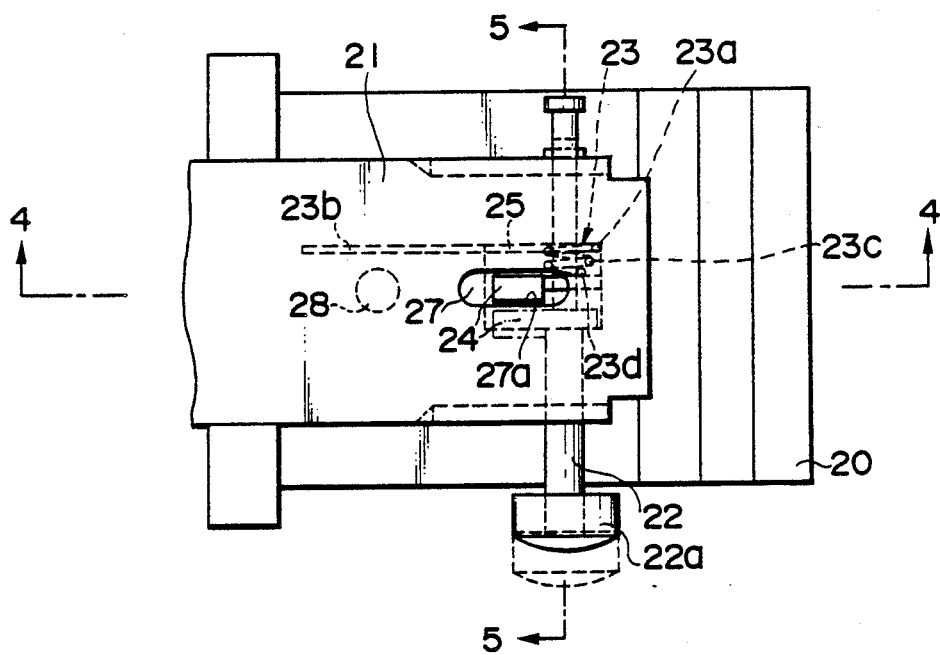
FIG. 3 is a partial cutaway plan view of a first embodiment of the safety device for a pneumatic tool according to this invention.

First, the operation button 22a is pushed so as to move the pivot shaft 22 axially against the biasing force of the coil spring 23, via the stop 24, from the position shown by the broken lines to the position shown by the solid lines in FIG. 3. The stop 24 is then pushed by the step portion 22b of the pivot shaft 22, and is moved to a position directly underneath the opening 27 of the pivot shaft 22 by the compressing of the main portion 23c of the coil spring 23. When the operation lever 21 is rotated downward about the pivot shaft 21 against the biasing force of the coil spring 23 while the stop 24 is held in its position under the opening 27, the upper portion of the stop 24 enters the opening 27 so that the stop 24 does not obstruct the operation of the operation lever 21. The operation lever 21 is then pushed down to the position shown by the two-dot chain lines in FIG. 4, thereby lowering the valve stem 28 to start the operation of the pneumatic tool.

The operation of the pneumatic tool is terminated by releasing the operation lever 21 exactly as in the case of the prior art, the released operation lever 21 being returned by the restoring force of the coil spring 23 to the position shown by the solid lines in FIG. 4. The valve stem 28 automatically returns to its original position to close an air passageway communicating with a driving mechanism of the pneumatic tool. At this point, the operation of the pneumatic tool is terminated.

Upon releasing the operation button 22a, the pivot shaft 21 is pushed back, via the stop 24, by the restoring force of the compressed main portion 23c of the coil spring 23, the stop 24 is moved from its position directly underneath the opening 27 of the operation lever 21 to a position displaced therefrom. As a result, the operation lever 21 is now in a locked state, and thus cannot be operated unless the pivot shaft 22 is first pushed into the main body 20 of the pneumatic tool.

Figure 7:
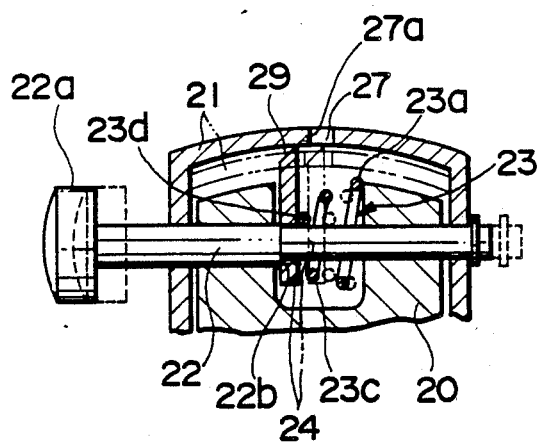
FIGS. 7 and 8 are cross-sectional views of a combination of stops and openings of second and third embodiments of this invention, respectively.

FIG. 7 shows a second embodiment of this invention, wherein the shape of the head portion of the stop 24 is modified from that of the first embodiment. In this embodiment, the head portion of the stop 24 has an inclined surface 29 which is inclined in the similar direction to that of the main portion 23c of the coil spring 23.

When the operation button 22a is released in the state where the stop 24 has entered the opening 27 during the pushing down of the operation lever 21, the upper part of the inclined surface 29 of the stop 24 abuts against the lower edge of the left end wall 27a of the opening 27. As the operation lever 21 is rotated upward by the biasing force of the coil spring 23 from the position of the two-dot chain lines to that of the solid lines, after the operation lever 21 has been released, the stop 24 is returned from the position of the broken lines to that of the solid lines while the lower edge of the left end wall 27a of the opening 27 is sliding on the inclined surface 29 of the stop 24. This ensures the smooth return of the operation lever 21 and the pivot shaft 22. Moreover, the combination of the inclined surface 29 of the stop 24 and the lower edge of the left end wall 27a of the opening 27 also ensures the smooth entry of the upper portion of the stop 24 into the opening 27 when the operation lever 21 is depressed.

What is claimed is:

1. A safety device for a pneumatic tool having a main body and a valve stem upon lowering of which operation of said pneumatic tool begins, comprising:

an operation lever having a flat lower face and movable between an operative position at which said operation lever lowers said valve stem and an inoperative position at which said operation lever is disengaged from said valve stem;

an axially movable pivot shaft for pivoting said operation lever to said main body of said pneumatic tool;

a stop facing said lower face of said operation lever and provided on said pivot shaft such that said stop is moved by means of said pivot shaft in said axial direction thereof, in response to said axial movement of said pivot shaft, between a rest position at which said stop is engageable with said lower face of said operation lever and an operating position, said stop being arranged to abut against said lower face of said operation lever so as to prevent said operation lever from being moved downward when said stop is at said rest position;

a spring comprising a coiled main portion wound around said pivot shaft and fixed thereto for permanently urging said stop toward said rest position of said stop, and a free end portion extending from said coiled main portion contacting said lower face of said operation lever for urging said operation lever toward said inoperative position of said operation lever; and a receiving chamber formed in said lower face of said operation lever at a position at which said receiving chamber receives said stop, upon downward movement of said operation lever, when said stop is moved to said operating position.

2. The device according to claim 1, wherein said stop comprises a plate situated perpendicular to said pivot shaft.

3. The device according to claim 2, wherein said receiving chamber comprises an opening formed in said operation lever.

4. The device according to claim 3, wherein said operation lever has an upper surface, and said opening extends axially of said pivot shaft and has a pair of end walls, a distance between which decreases as they approach said upper surface of said operation lever.

5. The device according to claim 1, wherein said operation lever has an upper surface, and said receiving chamber comprises a recess formed in said operation lever in such a manner that said recess opens downward and has a pair of end walls which are separated from each other axially of said pivot shaft and a distance between said end walls decreases as said end walls approach said upper surface of said operation lever.

6. The device according to claim 1, wherein said stop has a rounded head.

7. The device according to claim 1, wherein said stop has an upper portion having an inclined plane engageable with said receiving chamber.

8. A safety device for a pneumatic tool having a main body and a valve stem movable between first and second positions, respectively, enabling and preventing operation of the pneumatic tool, comprising:

an operation lever having a lower face and pivotable between an operative position at which said operation lever moves said valve stem into said first position and an inoperative position, enabling the valve stem for movement into said second position;

an axially movable pivot shaft for pivotally coupling said operation lever to said main body of the pneumatic tool;

a stop in opposition to said lower face of said operation lever and mounted on said pivot shaft such that said stop is movable axially with said pivot shaft in response to axial movement of said pivot shaft between a rest position at which said stop is engageable with said lower face of said operating lever and an operating position, said stop being arranged to abut against said lower face of said operation lever in the rest position of said stop to prevent pivoting of said lever toward said first position;

a spring comprising a coiled portion about said pivot shaft and fixed thereto for permanently urging said stop toward said rest position thereof and a free end portion extending from said coiled portion contacting said lower face of said operation lever for urging said operation lever toward said inoperative position thereof; and a receiving chamber formed in said operation lever for receiving said stop in response to axial movement thereof into its operating position thereby enabling said operation lever for pivotal movement toward said second position thereof.

9. The device according to claim 8, wherein said stop comprises a plate disposed perpendicular to said pivot shaft.

10. The device according to claim 8, wherein said receiving chamber comprises an opening formed in said operation lever.

11. The device according to claim 10, wherein said operation lever has an upper surface, and said opening extends axially of said pivot shaft and has a pair of end walls defining said opening tapering outwardly toward said upper surface of said operation lever.

* * * * *